United States Patent

[11] 3,543,643

| [72] | Inventor | Stanley William Southwell<br>Stroud, England |
|---|---|---|
| [21] | Appl. No. | 788,693 |
| [22] | Filed | Dec. 26, 1968<br>Continuation of Ser No. 682,268,<br>Nov. 13, 1967, abandoned. |
| [45] | Patented | Dec. 1, 1970 |
| [73] | Assignee | Winget Limited of<br>Rochester, Kent, England |
| [32] | Priority | Nov. 14, 1966 |
| [33] | | Great Britain |
| [31] | | 50,929/66 |

[54] FLUID OPERATED RAM ASSEMBLY FOR A POWER ASSISTED STEERING SYSTEM
4 Claims, 4 Drawing Figs.

[52] U.S. Cl. .................................................... 91/401,
91/446; 92/13, 92/168, 92/169
[51] Int. Cl. ........................................................ F15b 15/22,
F15b 13/04, F16j 15/18
[50] Field of Search ........................................... 91/401;
92/13, 163, 169, 170, 171, 164(Cursory)

[56] References Cited
UNITED STATES PATENTS

| 3,274,903 | 9/1966 | Fischer .......................... | 92/13 |
| 3,315,570 | 4/1967 | Brewer et al .................. | 91/401 |
| 2,556,979 | 6/1951 | Purcell .......................... | 92/164 |
| 3,040,712 | 6/1962 | Harrah .......................... | 92/170 |

FOREIGN PATENTS

| 1,125,999 | 7/1956 | France ......................... | 91/401 |

Primary Examiner—Paul E. Maslousky
Attorney—Mason, Kolehmainen, Rathburn and Wyss ABSTRACT: There is provided a fluid operated ram assembly for a power assisted steering system of the type including a cylinder housing and a double acting piston within the cylinder housing. The piston carries a pair of valves, one of which has a stem extending beyond the face of the piston confronting one end of the cylinder housing and is engageable therewith to mechanically open the valve. The other valve carried by the piston is in series with the first valve thereby to provide for the passage of fluid through the piston in order to reduce the fluid pressure and to retain the piston at one end at a reduced fluid pressure and to permit the fluid to pass through and beyond the piston. In addition the cylinder housing is formed in two assemblies, a power assembly and a skirt assembly therewith so as to provide for adjusting the length of the stroke of the ram.

Patented Dec. 1, 1970
3,543,643
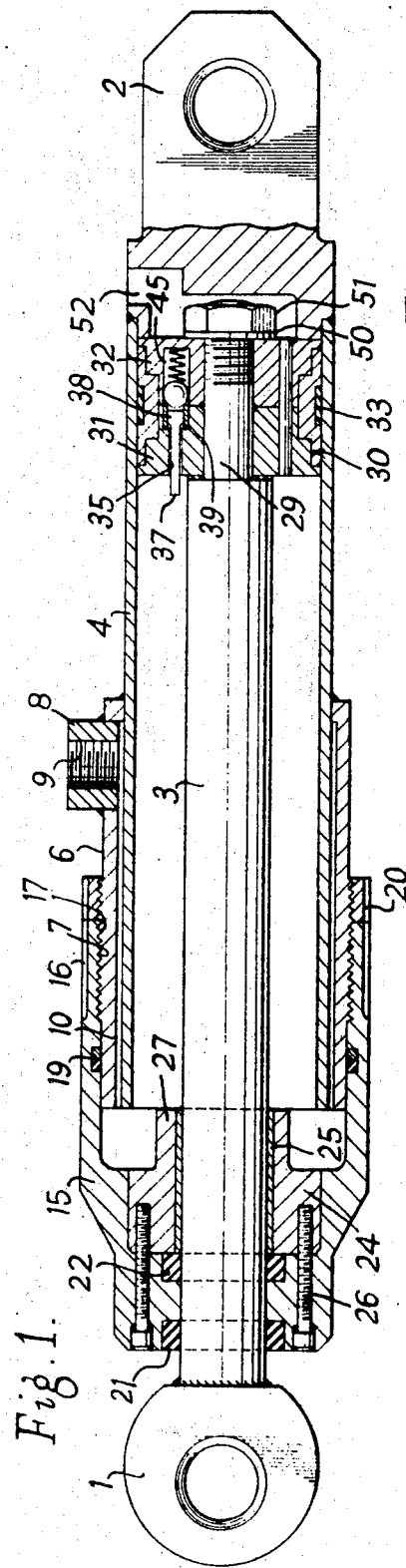
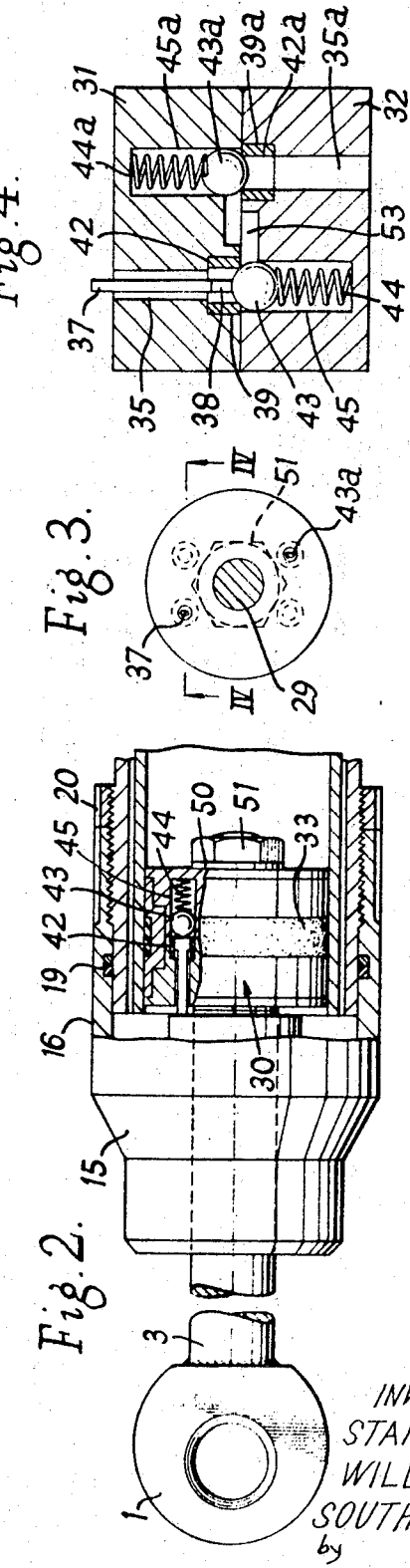
INVENTOR:
STANLEY
WILLIAM
SOUTHWELL
by
Mason, Kolehmainen, Rathburn & Wyss,
ATTYS

FLUID OPERATED RAM ASSEMBLY FOR A POWER ASSISTED STEERING SYSTEM

This application is a continuation of U.S. Pat. application Ser. No. 682,268, filed Nov. 13, 1967.

The invention relates to fluid operated power assisted steering systems and has particular application to wheeled motor vehicles but may be used in the steering systems of ships and aircraft.

In steering systems it is frequently necessary to effect adjustment in order to change the range of movement and in particular with wheeled vehicles it is necessary to change the tracking of the wheels. In power assisted steering systems incorporating internal jack stroke stops this may mean dismantling or complete removal of a system to effect a change in stroke so that it is necessary to bleed the system when reconnected to avoid air locks.

It is an object of the invention to provide a fluid operated ram assembly which permits adjustment to provide variation in the longitudinal stroke and length of the ram assembly and includes means for maintaining the ram assembly at a chosen end of its stroke at a reduced pressure from that of the supply source.

According to the present invention there is provided a fluid operated ram assembly for a power assisted steering system comprising a double action piston having two valves which on reaching the end of a stroke of a piston in one direction permit the passage of fluid through the piston in order to reduce the fluid pressure and to retain the piston at the end of its stroke at a reduced fluid pressure and to permit fluid to pass through and beyond the piston.

One of the valves may be provided by a poppet valve having its stem extending beyond one face of the piston or actuated by a push rod and the other valve may be provided by a ball. Both valves may be pressed on their seats by springs.

Preferably, the ram has a housing with means which permit adjustment of the longitudinal stroke of the piston. The piston is preferably connected to a piston rod which projects from one end of the housing and provides a mounting for one end of the assembly and the other end of the housing provides a further mounting for the assembly.

The adjustment of the housing may be provided by a sleeve member rotated with respect of the housing and including locking means for locking the sleeve member in any desired position on the housing. The sleeve member may carry an inwardly extending projection for engagement by the stem for the poppet valve.

Preferably, the piston is provided by two plates abutting on a centreline plane or interconnected by a member which provides a seating for an annular sealing member which during sliding relation between the periphery of the piston and the inner wall of the housing provides wiping engagement. The two valves may be mounted within or between the piston and plates.

The invention will now be described by way of example with reference to the accompanying drawings, in which:

FIG. 1 is a sectional plan view of a fluid operated steering ram shown in a retracted position;

FIG. 2 is a part sectional view of the construction shown in FIG. 1 in an extended position;

FIG. 3 is an end view of the piston assembly, and,

FIG. 4 is a sectional view taken on the line IV— IV of FIG. 3.

For the sake of clearness no mountings are shown in the accompanying drawings but the part designated 1 provides a ball or lug coupling which may be connected to a corresponding ball or forked housing of a steering linkage of a vehicle and that member designated 2 may be pivotally connected to a rigid component of the same vehicle.

In the drawings there is shown the ball or lug coupling 1 providing a head of a piston rod 3 which is slidably mounted within a casing 4. The casing 4 has rigidly connected therewith at one end a member 2, for example by welding. The opposite end of the casing 4 is provided with a double-wall part 6 which has a threaded portion 7 on its external surface and carries a fluid coupling 8 which is internally threaded at 9 to facilitate connection to a fluid system (not shown). There is provided in the double-wall part 6 one or more passages 10 which provide communication between the coupling 8 and the interior of the casing 4. A housing 15 which has a skirt 16 provided with an internal thread 17 is threaded on to the double-wall part 6 for engagement with the threaded portion 7. A seal 19 is carried by the inner wall of the skirt 16 to effect sealing between the skirt 16 and the double-wall part 6. A locking ring 20 effects locking between the skirt 16 and the double-wall part 6 of the casing 4. The housing 15 has a scraper wiper seal 21 and a seal 22 which provide sealing relation between the housing 15 and the periphery of the piston rod 3. Carried within the housing 15 is a bearing assembly 24 which is retained in position within the housing 15 by threaded screws 26 and carries a bearing 25 supporting the rod 3. An annular projection 27 extends from the bearing assembly 24, the function of which will be described later.

The piston rod 3 carries within the casing 4 on a part 29 of reduced diameter a piston assembly 30. The piston assembly 30 comprises two plates 31, 32 which are held together by retensioning of a threaded nut 51 and carries a seal 33 to provide sealing between the periphery of the piston assembly 30 and the internal wall of the casing 4. Seals (not shown) are provided between the plates 31, 32 to provide an effective seal between these components and the piston rod 3. The plate 31 nearest the housing 15 carried by the casing 4 has a bore 35 which guides and locates a poppet valve push rod having a rectangular stem part 37 which projects beyond the surface of the plate 31 and a rectangular retaining head 38 which is located within a recess 39 provided in that part of the plate 31 adjacent to the plate 32. Carried within the recess 39 is a valve seating 42 having a hollow bore which is clear of the retaining head 38 and provides a seating for the ball valve 43. The ball valve 43 is pressed into engagement with the seating 42 by means of a spring 44 located within a blind bore 45 within the end plate 32. The bore 45 is smaller in diameter than the valve seating 42 and thus the end of the bore 45 retains the seating 42 within end plate 31. The blind bore 45 communicates with a recess 39a in end plate 32 via a passage 53 in the abutting faces between the end plates 31 and 32. A recess 39a houses a valve seating 42a and is concentric with a bore 45a. A ball valve 43a is pressed into engagement with a seating 42a by means of a spring 44a located within a blind bore 45a within end plates 31. It should be noted that end plates 31 and 32 are identical.

The whole piston assembly 30 is locked on the part 29 of reduced section of the piston rod 3 by a tab washer 50 and a threaded nut 51.

When in the position shown in FIG. 1 of the accompanying drawings fluid is supplied under pressure through a port 52 provided in the member 2 of the casing 4 to act on the full area of the piston at the free end of the piston assembly and this pressure is communicated via bore 45a and the passage 53 to the ball valve 43 which due to the spring 44 together with the fluid pressure is pressed firmly against its seating thereby ensuring that there is a buildup of the fluid pressure at the free end of the piston to cause the piston rod 3 to be extended from the casing 4, i.e. to move to the position shown in FIG. 2.

In this way, hydrostatic power is converted to mechanical power by the extension of the piston rod from the casing. On reaching the position shown in FIG. 2 the stem 37 contacts the projecting portion 27 of the bearing assembly 24 within the housing 15 so that the ball valve 43 is moved from its seat to permit fluid to pass through the bore 35a and the passage 53 and the bore 35 of the piston and flow along the passage 10 in the double-wall part 6 to the coupling 8.

Adjustment of the longitudinal stroke of the piston rod 3 is carried out by first unlocking the locking ring 20 and by rotating the housing 15 with respect of the part 6 it is possible to adjust the position of the projection member 26 of the housing 15. During this adjustment there is no escape of fluid due to the seal 19 provided between the housing 15 and the part 6. When the required position of the projecting member 26 has been located the locking ring 20 is rotated to lock the housing 15 and the part 6 together. During this operation the couplings 8 and the part 52 remain in a static position and are not effected by this adjustment.

To return the piston rod 3 to the original position within the casing 4 fluid is supplied through the coupling 8 and passes along the passage 10 to the interior of the casing 4 to act on the annular face on the end of the piston 30 and to communicate pressure via the bore 35 and the passage 53 to the ball valve 43a but due to the pressure of the spring 44a and to the communicated fluid pressure the ball valve 43a is firmly retained on its seating and the passage of fluid through the piston is prevented and consequently on buildup of pressure within the casing 4 the piston rod 3 moves to the original position as shown in FIG. 1 of the accompanying drawing.

It will be appreciated that by this arrangement it is unnecessary to disconnect the couplings which provide connecting of fluid to the coupling 8 or the port 52 when it is desired to adjust the movement of the piston rod 3 with respect to the casing 4 and in this way avoids the necessity of bleeding the fluid system to remove air locks as is the case where it is necessary to uncouple the fluid supply lines.

It will also be appreciated that the assembly is retained at the end of its stroke with a reduced fluid pressure and the piston end load is reached within the casing without loads being communicated through steering linkages to axle stops as is common in some installations.

I claim:

1. A fluid operated ram assembly for a power assisted steering system comprising:
   a cylinder housing closed at both ends;
   a double acting piston in said housing movable in a first direction toward a first end of said cylinder housing effective on reaching said first end to provide for the passage of fluid therethrough in order to reduce the fluid pressure and to retain the piston at said first end at a reduced fluid pressure and to permit the fluid to pass through and beyond the piston;
   a poppet valve carried by said piston having a stem extending beyond the face of said piston confronting said first end of said cylinder housing and engageable therewith to mechanically open said poppet valve;
   a second valve carried by said piston in series therewith communicating with the opposite face of said piston; and
   a piston rod connected to said piston and extending through said first end of said cylinder housing, said piston being formed of:
   two juxtapositioned plates;
   each having a through bore defining a valve passage and forming a valve seat facing the other plate;
   each having a closed bore alined with the through bore of the other plate and defining a valve chamber;
   passage means interconnecting the closed ends of the bores and formed in the confronting surfaces of said plates interconnecting the valve chambers;
   said valves each including a valve element in each one of said valve chambers closable against its respective valve seat; and
   said valve stem extending through the through bore of the plate closest to said first end of said cylinder housing.

2. A double acting fluid operated ram assembly for a power assisted steering system of the type having an adjustable piston stroke and comprising:
   a cylinder member including;
   a casing open at one end and defining a cylinder, said casing having a double-wall part adjacent said open end and defining a passageway communicating with said cylinder;
   a fluid coupling carried on said casing communicating with said passageway; and
   a skirt assembly threaded on said double-wall part;
   a double acting piston in said cylinder;
   a fluid system operatively connected to said cylinder;
   a piston rod connected to said piston and extending through the end of said skirt assembly whereby the length of stroke of said ram assembly may be adjusted by rotation of said skirt assembly on said casing without rotating said casing and said piston rod so as to provide for axial adjustment of said skirt assembly and said casing without opening the fluid system.

3. A fluid operated ram assembly as set forth in claim 2 including means defining a fluid seal between said casing and said skirt assembly.

4. A fluid operated ram assembly as set forth in claim 2 wherein said piston is of the double acting type and is effective on reaching said skirt assembly to provide for the passage of fluid therethrough in order to reduce the fluid pressure and to retain the piston at this position at a reduced fluid pressure to permit the fluid to pass through and beyond the piston, said piston being provided with first and second bores each closed at one end opening in opposite directions, said piston including:
   a first poppet valve in said first bore having a stem extending beyond the face thereof confronting the skirt assembly and mechanically engageable therewith to open said poppet valve; and
   a second poppet valve in said second bore in series with said first bore communicating with the opposite face of said piston.